(12) United States Patent
Kimura et al.

(10) Patent No.: US 11,168,900 B2
(45) Date of Patent: Nov. 9, 2021

(54) PNEUMATIC RADIATION AIR CONDITIONER

(71) Applicant: KIMURA KOHKI CO., LTD., Osaka (JP)

(72) Inventors: Keiichi Kimura, Yao (JP); Katsuhiro Urano, Sakai (JP); Masaki Shioji, Ise (JP)

(73) Assignee: KIMURA KOHKI CO., LTD., Osaka (JP)

(*) Notice: Subject to any disclaimer, the term of this patent is extended or adjusted under 35 U.S.C. 154(b) by 157 days.

(21) Appl. No.: 16/564,127

(22) Filed: Sep. 9, 2019

(65) Prior Publication Data

US 2020/0080732 A1 Mar. 12, 2020

(30) Foreign Application Priority Data

Sep. 11, 2018 (JP) .............................. JP2018-169646

(51) Int. Cl.
| | |
|---|---|
| *F24F 1/029* | (2019.01) |
| *F24F 13/32* | (2006.01) |
| *F24F 5/00* | (2006.01) |
| F24F 13/20 | (2006.01) |
| F24F 13/06 | (2006.01) |

(52) U.S. Cl.
CPC ............ *F24F 1/029* (2019.02); *F24F 5/0089* (2013.01); *F24F 13/32* (2013.01); *F24F 2013/0608* (2013.01); *F24F 2013/205* (2013.01)

(58) Field of Classification Search
CPC .......... F24F 1/029; F24F 13/32; F24F 13/068; F24F 5/0092; F24F 5/0089; F24F 2013/0608; F24F 2013/205; F24F 5/0017; F24F 7/08; F24F 13/06; F24F 2221/14

See application file for complete search history.

(56) References Cited

U.S. PATENT DOCUMENTS

2010/0263829 A1* 10/2010 Kimura ................. F24F 13/078
165/59

FOREIGN PATENT DOCUMENTS

| CN | 103968515 A | * 8/2014 |
|---|---|---|
| CN | 103968515 A | 8/2014 |
| EP | 3540319 A1 | 9/2019 |
| JP | 10148368 A | * 6/1998 |
| JP | H10148368 A | 6/1998 |
| JP | 2006112755 A | 4/2006 |
| JP | 2007155205 A | 6/2007 |
| JP | 2011021808 A | 2/2011 |

(Continued)

*Primary Examiner* — Frantz F Jules
*Assistant Examiner* — Martha Tadesse
(74) *Attorney, Agent, or Firm* — Alleman Hall Creasman & Tuttle LLP

(57) ABSTRACT

A pneumatic radiation air conditioner includes: a radiation unit configured to radiate air-conditioning air; and a fan configured to feed the air-conditioning air to the radiation unit. The radiation unit includes: a first chamber, through which the air-conditioning air flows; a second chamber configured to take in the air-conditioning air discharged from the first chamber and discharge the air-conditioning air and radiate heat of the air-conditioning air to a space to be air conditioned; and an air stream adjuster configured to adjust air velocity distribution and air volume distribution of the air-conditioning air that is discharged from the first chamber to the second chamber.

6 Claims, 8 Drawing Sheets

(56) References Cited

FOREIGN PATENT DOCUMENTS

| | | |
|---|---|---|
| JP | 2011-145045 A | 7/2011 |
| JP | 2012007766 A | 1/2012 |
| JP | 2012007852 A | 1/2012 |

\* cited by examiner

PNEUMATIC RADIATION AIR CONDITIONER

CROSS-REFERENCE TO RELATED APPLICATION

This application claims priority to and the benefit of Japanese Patent Application No. 2018-169646, filed on Sep. 11, 2018, the entire disclosure of which is incorporated herein by reference.

BACKGROUND OF THE INVENTION

Field of the Invention

The present invention relates to a pneumatic radiation air conditioner for performing air conditioning of a space to be air conditioned.

Description of the Related Art

One of the conventional pneumatic radiation air conditioners utilizing air streams is disclosed by, for example, Japanese Laid-Open Patent Application Publication No. 2011-145045. The pneumatic radiation air conditioner disclosed by Japanese Laid-Open Patent Application Publication No. 2011-145045 includes: an air feeder configured to discharge air that has been cooled or heated by a heat exchanger, the air feeder discharging the air as a jet flow of air to a space to be air conditioned; an air inducer configured to draw in (i.e., induce) air from the space to be air conditioned by an inducing effect of the jet flow of air discharged from the air feeder; and an air mixer configured to discharge mixed air of the jet flow of air from the air feeder and the air induced by the air inducer to the space to be air conditioned, and radiate the heat of the mixed air to the space to be air conditioned. Owing to a radiation effect and induction reheating effect produced by this structure, comfortable air conditioning that causes neither drafty feeling nor temperature irregularity can be performed. Generally speaking, the term "drafty feeling" means uncomfortableness that a human body experiences when cooled air flows down on the human body in the space to be air conditioned.

As described above, pneumatic radiation air conditioners serve to create a comfortable space. However, conventional pneumatic radiation air conditioners are complex in structure, and the manufacturing cost thereof is high.

An object of the present invention is to provide a pneumatic radiation air conditioner having a simple structure and yet being capable of performing comfortable air conditioning.

SUMMARY OF THE INVENTION

A pneumatic radiation air conditioner according to one aspect of the present invention includes: a radiation unit configured to radiate air-conditioning air; and a fan configured to feed the air-conditioning air to the radiation unit. The radiation unit includes: a first chamber, through which the air-conditioning air flows; a second chamber configured to take in the air-conditioning air discharged from the first chamber and discharge the air-conditioning air and radiate heat of the air-conditioning air to a space to be air conditioned; and an air stream adjuster configured to adjust air velocity distribution and air volume distribution of the air-conditioning air that is discharged from the first chamber to the second chamber.

According to the configuration of the above aspect, the pneumatic radiation air conditioner has a simple structure including the two chambers and the air stream adjuster. This makes it possible to lower the manufacturing cost of the pneumatic radiation air conditioner and reduce the weight of the entire air conditioner. As a result, the installation and maintenance of the pneumatic radiation air conditioner can be readily performed. Since the air velocity distribution and air volume distribution of the air-conditioning air are adjusted by the air stream adjuster, the air volume distribution of the air-conditioning air can be made uniform in the second chamber, and consequently, the discharge or radiation of the air-conditioning air to the space to be air conditioned can be made uniform.

In another aspect of the present invention, the air stream adjuster includes a group of first through-holes formed therein, through which the air-conditioning air is discharged to the second chamber. The second chamber includes a group of second through-holes formed therein, through which the air-conditioning air is discharged to the space to be air conditioned. A total area of the group of second through-holes is greater than a total area of the group of first through-holes.

According to the above configuration, the air velocity of the air-conditioning air is gradually reduced by increasing the static pressure of the air-conditioning air in two stages with the group of first through-holes and the group of second through-holes, and thereby the air-conditioning air can be spread over the entire space in both the first chamber and the second chamber. Consequently, the discharge or radiation of the air-conditioning air to the space to be air conditioned can be made uniform, and comfortable air conditioning that causes neither drafty feeling nor temperature irregularity can be performed. In this configuration, a group of through-holes are formed in each of the two chambers, i.e., the structure is simple, which makes it possible to lower the manufacturing cost of the pneumatic radiation air conditioner and reduce the weight of the entire air conditioner. As a result, the installation and maintenance of the pneumatic radiation air conditioner can be readily performed.

In yet another aspect of the present invention, the air stream adjuster includes: a third through-hole, through which the air-conditioning air is discharged to the second chamber; a guide disposed in the third through-hole and configured to guide an air stream; and an airflow path that is a space between the guide and the third through-hole, the airflow path being configured such that an area of passage of the air stream in the airflow path increases from an upwind side to a downwind side.

According to the above configuration, since the area of passage of the air stream in the airflow path increases from the upwind side to the downwind side, the air-conditioning air is diffused while decreasing its air velocity, and thereby the air-conditioning air can be spread over the entire space in the second chamber. Consequently, the discharge or radiation of the air-conditioning air to the space to be air conditioned can be made uniform, and comfortable air conditioning that causes neither drafty feeling nor temperature irregularity can be performed.

In yet another aspect of the present invention, the guide includes: a support portion disposed such that a gap is formed between the support portion and a peripheral surface of the third through-hole; and a flap portion provided downwind of the support portion, the flap portion being sloped in a manner to expand from the upwind side to the downwind side, the flap portion being configured to change an advancing direction of the air-conditioning air that passes through the gap between the support portion and the peripheral surface of the third through-hole.

According to the above configuration, the support portion is disposed such that the gap is formed between the support portion and the peripheral surface of the third through-hole. Accordingly, streams of the air-conditioning air flowing out of the gap between the support portion and the third through-hole can be caused to flow away from each other by the flap portion, and thereby the air-conditioning air can be caused to flow uniformly. The air-conditioning air can also be caused to flow in a single direction, i.e., non-uniformly, by the flap portion. Thus, by changing the arrangement of the support portion in the third through-hole, the air volume distribution of the air-conditioning air can be adjusted freely.

In yet another aspect of the present invention, an area of passage of the air-conditioning air in the first chamber decreases from an upwind side to a downwind side.

According to the above configuration, the air velocity of the air-conditioning air increases from the upwind side to the downwind side, and thereby the air-conditioning air can be spread over the entire space in both the first chamber and the second chamber. Consequently, the discharge or radiation of the air-conditioning air to the space to be air conditioned can be made uniform, and comfortable air conditioning that causes neither drafty feeling nor temperature irregularity can be performed.

In yet another aspect of the present invention, the second chamber includes a heat storage unit constituted by a plurality of plates, the heat storage unit being configured to store the heat of the air-conditioning air discharged from the second chamber and radiate the stored heat. The plurality of plates are arranged such that a gap is formed between every two adjacent plates, the gap allowing the air-conditioning air to pass therethrough.

According to the above configuration, the heat storage unit can be used for both storing the heat of the air-conditioning air and straightening the flow of the air-conditioning air. This makes it possible to improve the thermal radiation performance of the heat storage unit, and assuredly reduce air volume irregularity and temperature irregularity.

In yet another aspect of the present invention, the second chamber includes an air discharger that is formed on a part of the second chamber, the part facing the space to be air conditioned. The air discharger has a corrugated shape in which ridges and grooves are alternately arranged in a width direction or a depth direction of the space to be air conditioned.

According to the above configuration, the air discharger of the second chamber, the air discharger facing the space to be air conditioned, has a corrugated shape. Accordingly, the contact area between the air-conditioning air and the air discharger is greater than in a case where the air discharger has a flat shape. This makes it possible to improve the thermal radiation performance of the air discharger.

In yet another aspect of the present invention, the pneumatic radiation air conditioner further includes a heat exchanger disposed on an air passage between the fan and the radiation unit, the heat exchanger being configured to perform heat exchange of the air-conditioning air.

The above configuration makes it possible to supply temperature-controlled comfortable air-conditioning air to the space to be air conditioned.

The above and other objects, features, and advantages of the present invention will more fully be apparent from the following detailed description of preferred embodiments with accompanying drawings.

DESCRIPTION OF THE PREFERRED EMBODIMENTS

Embodiment 1

Figure 1:
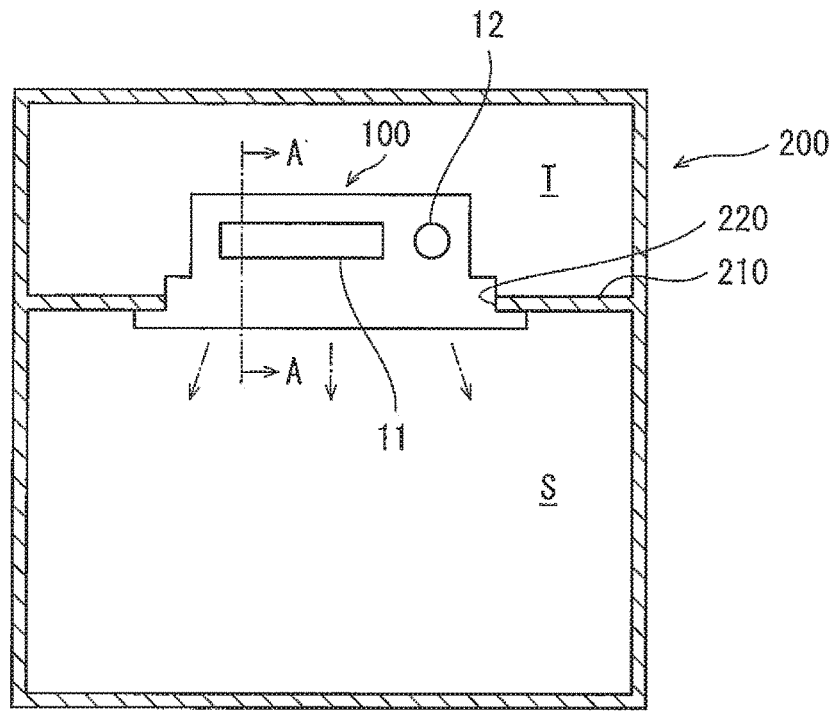
FIG. 1 is a schematic diagram of a building structure, in which a pneumatic radiation air conditioner according to the present invention is installed.

FIG. 1 is a schematic diagram of a building structure 200, in which a pneumatic radiation air conditioner 100 according to the present invention is installed. Hereinafter, the right-left direction of the building structure 200 in FIG. 1 is referred to as the width direction, and the direction orthogonal to the plane of FIG. 1 is referred to as the depth direction. The building structure 200 includes therein a space S to be air conditioned and a ceiling chamber T. The space S to be air conditioned is, for example, a room. The ceiling chamber T is positioned above the space S to be air conditioned, and a ceiling board 210 is installed separating between the ceiling chamber T and the space S to be air conditioned. The ceiling board 210 includes an opening 220 formed therein, through which air-conditioning air from the pneumatic radiation air conditioner 100 is discharged. The pneumatic radiation air conditioner 100 is disposed in the ceiling chamber T, and discharges the air-conditioning air to the space S to be air conditioned.

Figure 2:
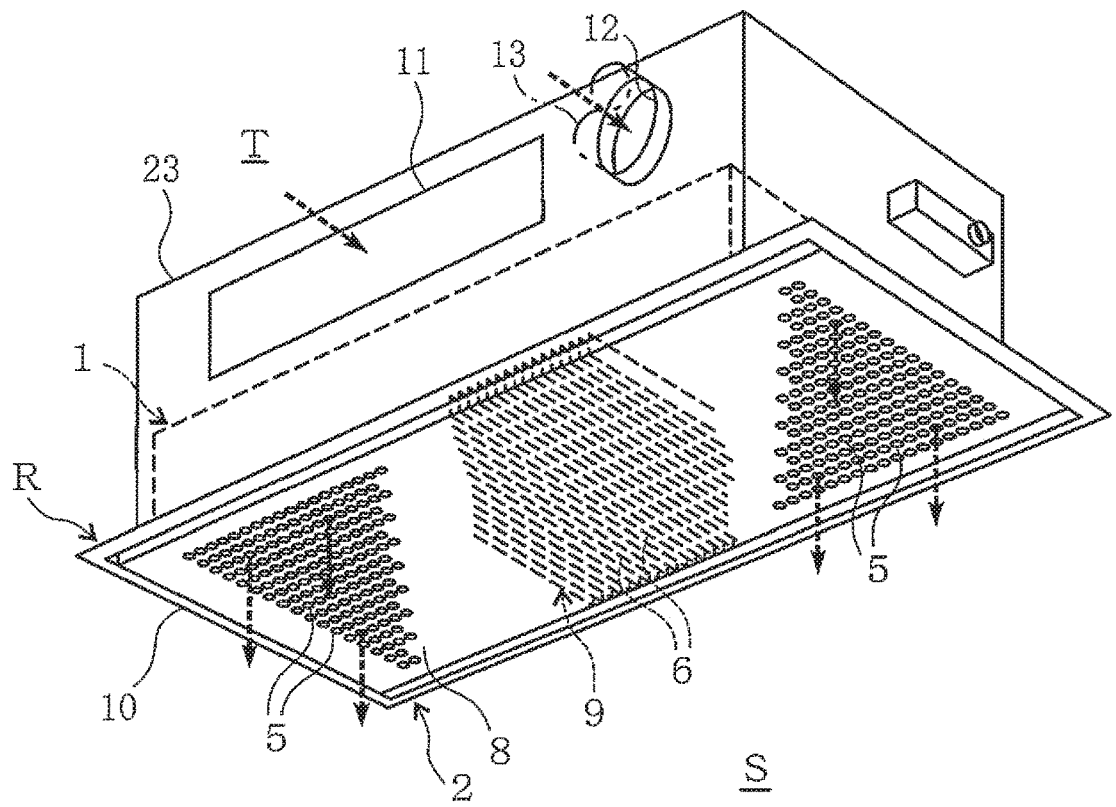
FIG. 2 is a bottom perspective view of the pneumatic radiation air conditioner.
Figure 3:
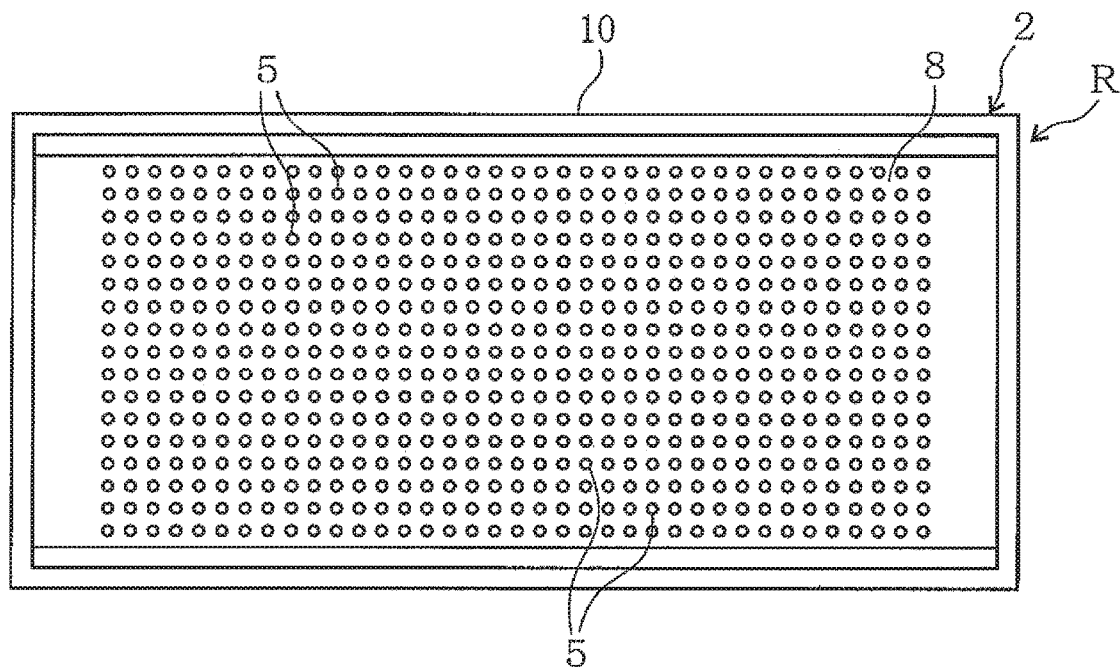
FIG. 3 is a bottom view of the pneumatic radiation air conditioner.
Figure 4:
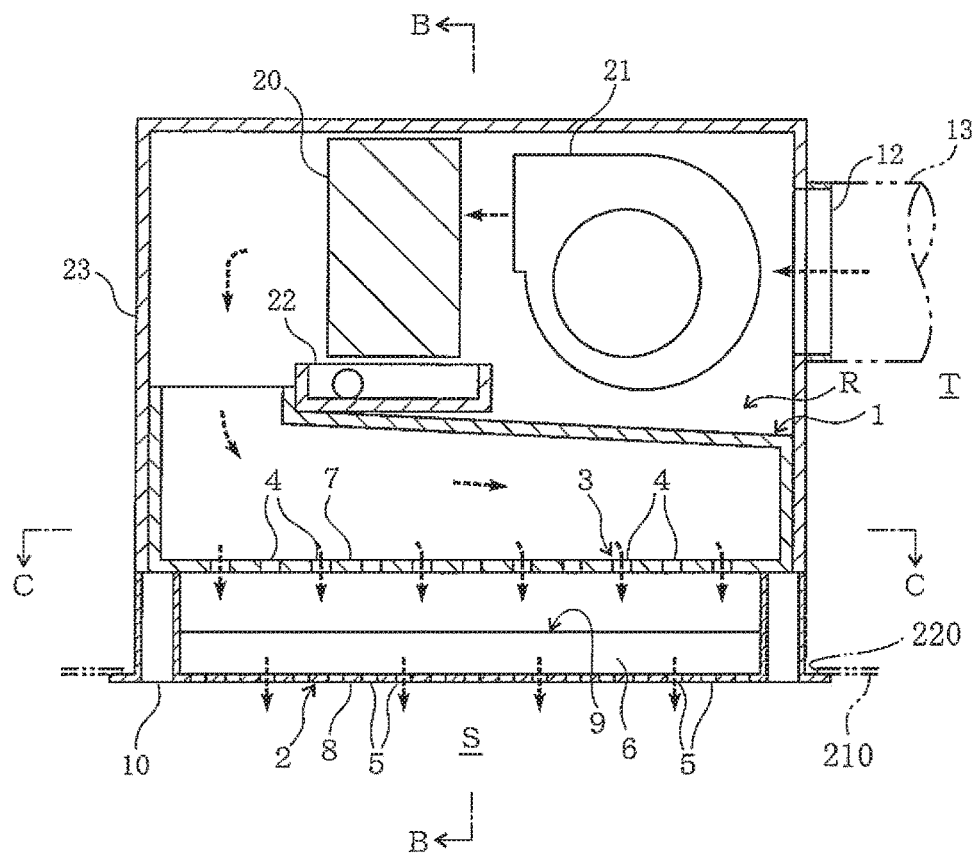
FIG. 4 is a sectional view of the pneumatic radiation air conditioner of FIG. 1, taken along a plane including line A-A of FIG. 1.
Figure 5:
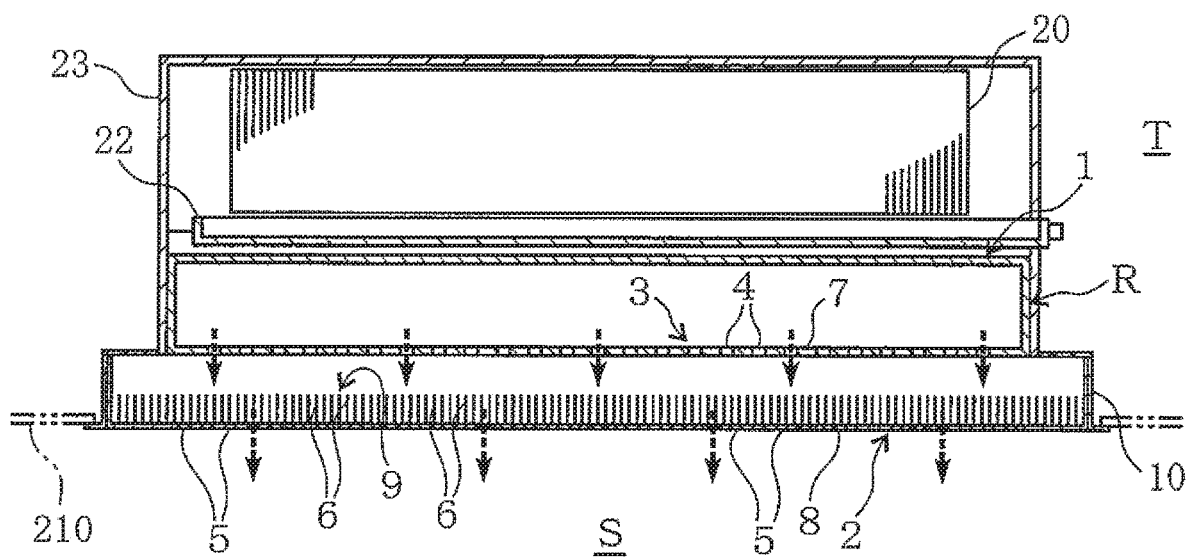
FIG. 5 is a sectional view of the pneumatic radiation air conditioner of FIG. 4, taken along a plane including line B-B of FIG. 4.
Figure 6:
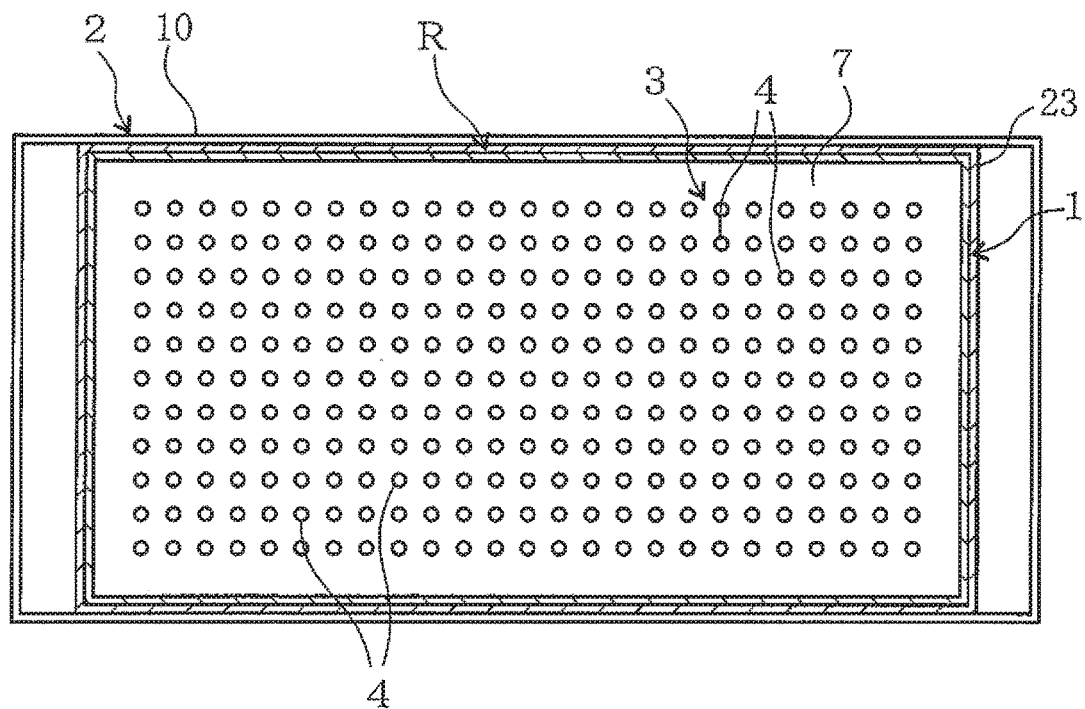
FIG. 6 is a sectional view of the pneumatic radiation air conditioner of FIG. 4, taken along a plane including line C-C of FIG. 4.
Figure 7:
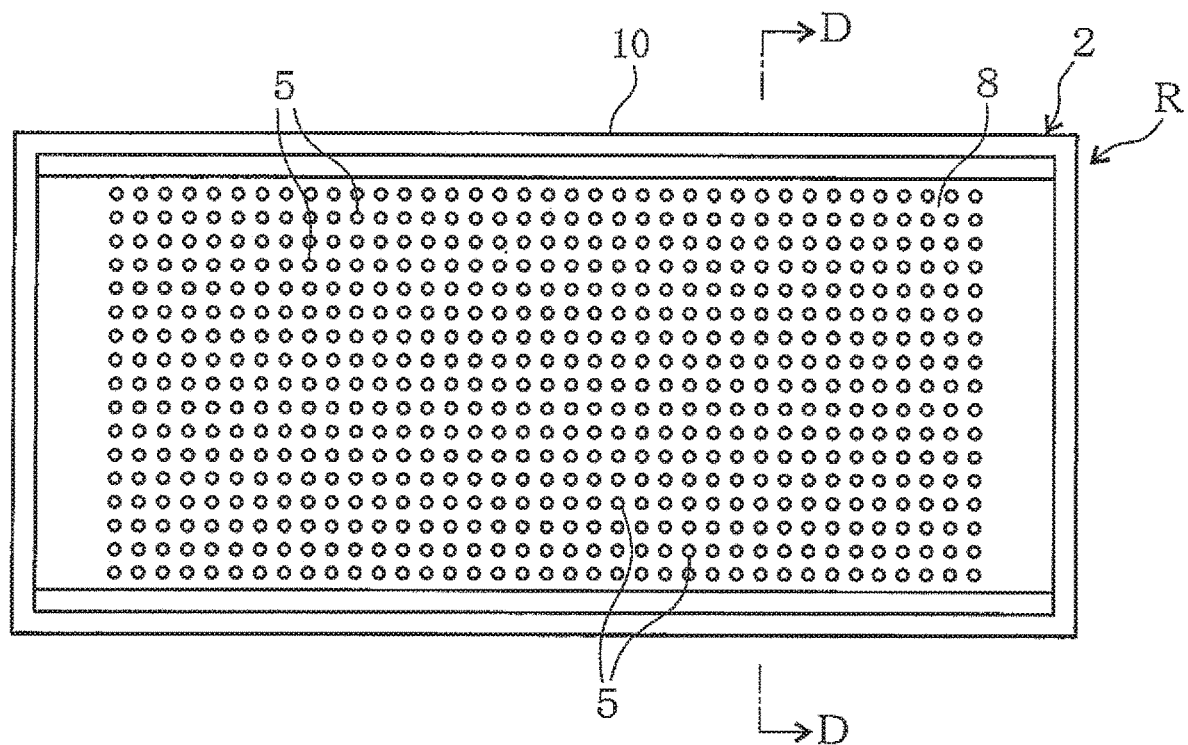
FIG. 7 is a bottom view of the pneumatic radiation air conditioner according to Embodiment 2.
Figure 8:
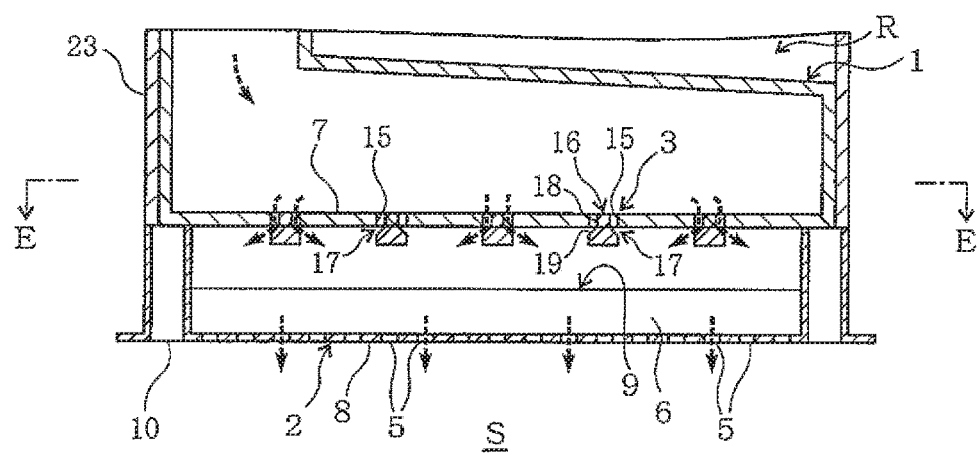
FIG. 8 is a sectional view of the pneumatic radiation air conditioner of FIG. 7, taken along a plane including line D-D of FIG. 7.

FIG. 2 is a bottom perspective view of the pneumatic radiation air conditioner 100. FIG. 3 is a bottom view of the pneumatic radiation air conditioner 100. FIG. 4 is a sectional view of the pneumatic radiation air conditioner 100 of FIG. 1, taken along a plane including line A-A of FIG. 1. FIG. 5 is a sectional view of the pneumatic radiation air conditioner 100 of FIG. 4, taken along a plane including line B-B of FIG. 4. FIG. 6 is a sectional view of the pneumatic radiation air conditioner 100 of FIG. 4, taken along a plane including line C-C of FIG. 4.

The pneumatic radiation air conditioner 100 includes: a radiation unit R disposed in a casing 23 and configured to discharge the air-conditioning air to the space S to be air conditioned; a heat exchanger 20 configured to perform heat exchange of the air-conditioning air, such as outside air and return air; a fan 21 configured to feed the air-conditioning air to the radiation unit R; and a drain pan 22 positioned below the heat exchanger 20, the drain pan 22 serving to collect water produced by the heat exchanger 20 during cooling and drain the water to the outside. In the drawings, bold dotted arrows each indicate a direction in which the air-conditioning air flows.

The radiation unit R includes: a first chamber 1, through which the air-conditioning air that has passed through the heat exchanger 20 flows; a second chamber 2 positioned below the first chamber 1, the second chamber 2 being configured to take in the air-conditioning air discharged from the first chamber 1 and discharge the air-conditioning air and radiate the heat of the air-conditioning air to the space S to be air conditioned; and an air stream adjuster 3 provided between the first chamber 1 and the second chamber 2, the air stream adjuster 3 being configured to adjust the air velocity distribution and air volume distribution of the air-conditioning air that is discharged from the first chamber 1 to the second chamber 2.

The pneumatic radiation air conditioner 100 is mounted to the opening 220 of the ceiling board 210 in such a manner that the bottom surface of the second chamber 2 faces the space S to be air conditioned. The casing 23 includes: a return air inlet 11, through which to take in the air (return air) from the space S to be air conditioned via the ceiling chamber T and a duct (not shown); and an outside air inlet 12, through which to take in the outside air. The outside air inlet 12 is connected to the outside of the building structure 200 via a duct 13.

Figure 15:
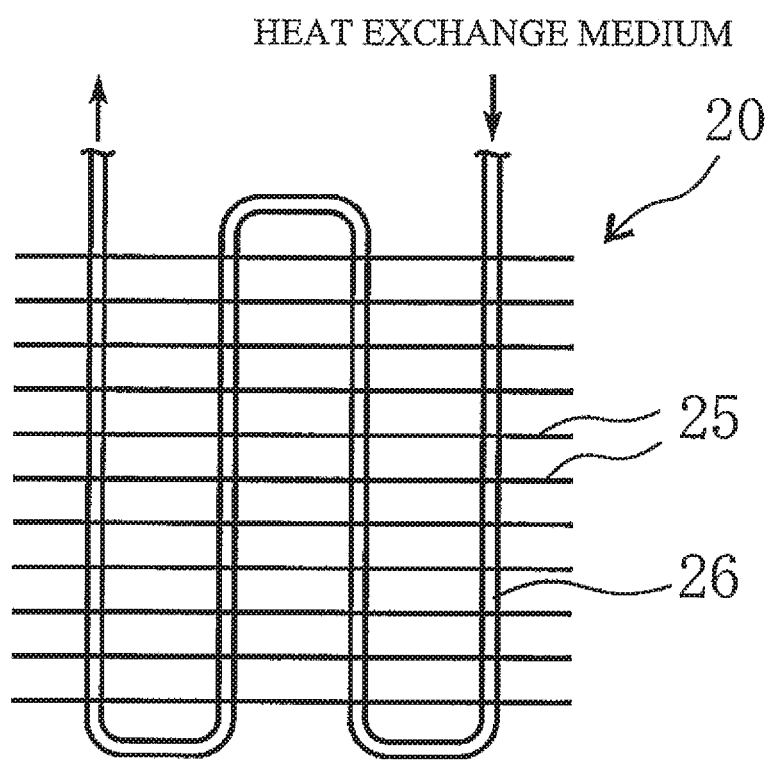
FIG. 15 shows a general configuration of a heat exchanger.

Various types of heat exchangers are adoptable as the heat exchanger 20, such as: one type of heat exchanger that performs heat exchange of the air-conditioning air by utilizing cold water or hot water; another type of heat exchanger that performs heat exchange of the air-conditioning air by utilizing a refrigerant; and other types of heat exchangers. As shown in FIG. 15, the heat exchanger 20 is formed by attaching a group of heat transfer pipes 26 to a group of heat transfer plates 25 by insertion. A heat exchange medium (cold water, hot water, or a refrigerant) is flowed through the inside of the heat transfer pipes 26, and the air-conditioning air is brought into contact with the heat transfer pipes 26 and the heat transfer plates 25. As a result, the air-conditioning air and the heat exchange medium exchange heat with each other, and thereby the air-conditioning air is cooled or heated. Preferably, the outer periphery of each of the heat transfer pipes 26 is ellipse-shaped. However, the outer periphery of each of the heat transfer pipes 26 may be circular-shaped.

As shown in FIG. 4, the air stream adjuster 3 includes a group of first through-holes 4 formed therein. The air-conditioning air from the first chamber 1 flows into the first through-holes 4, and is discharged to the second chamber 2 through the first through-holes 4. The second chamber 2 includes a group of second through-holes 5 formed therein, through which the air-conditioning air is discharged to the space S to be air conditioned. The first chamber 1 includes a flat plate-shaped first air discharger 7 configured to discharge the air-conditioning air through the air stream adjuster 3. The area of passage of the air-conditioning air in the first chamber 1 (i.e., the area of passage as seen in the direction orthogonal to the cross section of FIG. 5) decreases from the upwind side to the downwind side. Accordingly, the air velocity of the air-conditioning air increases from the upwind side to the downwind side in the first chamber 1, and thereby the air-conditioning air can be spread over the entire space in both the first chamber 1 and the second chamber 2.

The second chamber 2 includes: a flat plate-shaped second air discharger 8 including the group of second through-holes 5 formed therein, through which the air-conditioning air is discharged to the space S to be air conditioned; a heat storage unit 9 configured to store and radiate the heat of the air-conditioning air; and a flange-equipped frame member 10, to which the second air discharger 8 and the heat storage unit 9 are mounted. The total area of the group of second through-holes 5 is set to be greater than the total area of the group of first through-holes 4. Owing to such setting, the air velocity of the air-conditioning air is gradually reduced by increasing the static pressure of the air-conditioning air in two stages with the group of first through-holes 4 and the group of second through-holes 5, and thereby the air-conditioning air can be spread over the entire space in both the first chamber 1 and the second chamber 2. Conceivable examples of the shape of each of the first through-holes 4 and the second through-holes 5 include a perfect circle, an ellipse, an elongated hole, and a thin hole.

As shown in FIG. 5, the heat storage unit 9 is constituted by a plurality of plates 6, which store and radiate the heat of the air-conditioning air. The plates 6 are arranged such that a gap is formed between every two adjacent plates 6, the gap allowing the air-conditioning air to pass therethrough. The plates 6 are provided upright on the second air discharger 8 and extend in a direction in which the air-conditioning air passes. The plates 6 and the second air discharger 8 are made of, for example, aluminum whose thermal conductivity and thermal radiation rate are higher than those of other metals. By passing through between the plurality of plates 6, the air-conditioning air spreads out, and is discharged to the space S to be air conditioned through the second through-holes 5. The heat of the air-conditioning air is thermally transferred to the plurality of plates 6 and the second air discharger 8. The thermally transferred heat is radiated from the plurality of plates 6 to the space S to be air conditioned through the group of second through-holes 5, and also radiated from the second air discharger 8 directly to the space S to be air conditioned. That is, the heat storage unit 9 is used for both storing the heat of the air-conditioning air and straightening the flow of the air-conditioning air.

Each of the first chamber 1 and the second chamber 2 is a thin box-shaped chamber. In FIG. 4 and FIG. 5, each of the first chamber 1 and the second chamber 2 has a rectangular flattened shape. Other conceivable examples of the shape of each of the first chamber 1 and the second chamber 2 include a long and thin shape, a square shape, and a circular shape.

Embodiment 2

FIGS. 7 to 12 show Embodiment 2 of the pneumatic radiation air conditioner 100 of the present invention. In the present embodiment, the air stream adjuster 3 includes: third through-holes 15, through which the air-conditioning air is discharged to the second chamber 2; guides 16 disposed in the third through-holes 15, respectively; and airflow paths 17. The third through-holes 15 are formed in the first air discharger 7. The airflow paths 17 are formed by: gaps between the guides 16 and the third through-holes 15, the gaps allowing the air-conditioning air to pass therethrough; and spaces diagonally below the gaps. Each airflow path 17 is configured such that the area of passage of an air stream in the airflow path 17 (i.e., the area of passage as seen in the direction orthogonal to the cross section of FIG. 11) increases from the upwind side to the downwind side.

Figure 11:
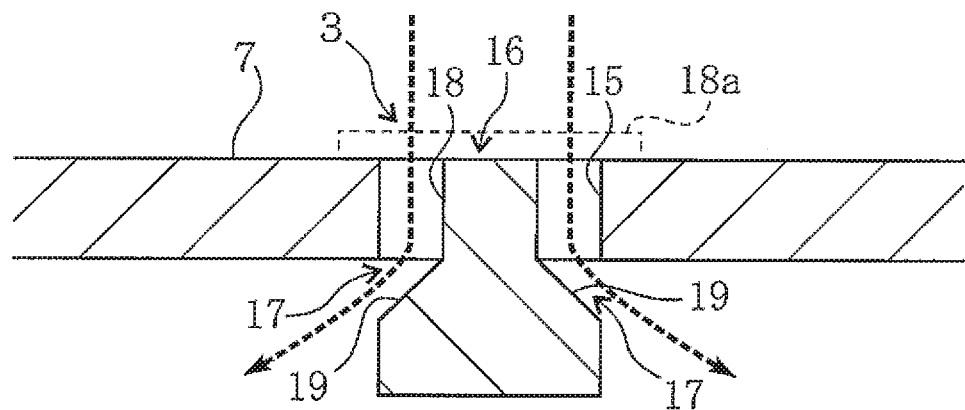
FIG. 11 is an enlarged sectional view of the air stream adjuster of FIG. 8.

Each guide 16 includes: a support portion 18 disposed such that a gap is formed between the support portion 18 and the inner peripheral surface of the third through-hole 15; and a flap portion 19 provided downwind of the support portion 18, the flap portion 19 being sloped in a manner to expand from the upwind side to the downwind side. The flap portion 19 changes the advancing direction of the air-conditioning air that passes through the gap between the support portion 18 and the peripheral surface of the third through-hole 15. In FIG. 11, for example, a support bar 18a indicated by dotted line may be provided on the upper end of the support portion 18, and the support bar 18a may be brought into contact with the upper peripheral edge of the third through-hole 15. This makes it possible to stably support the guide 16.

Figure 9:
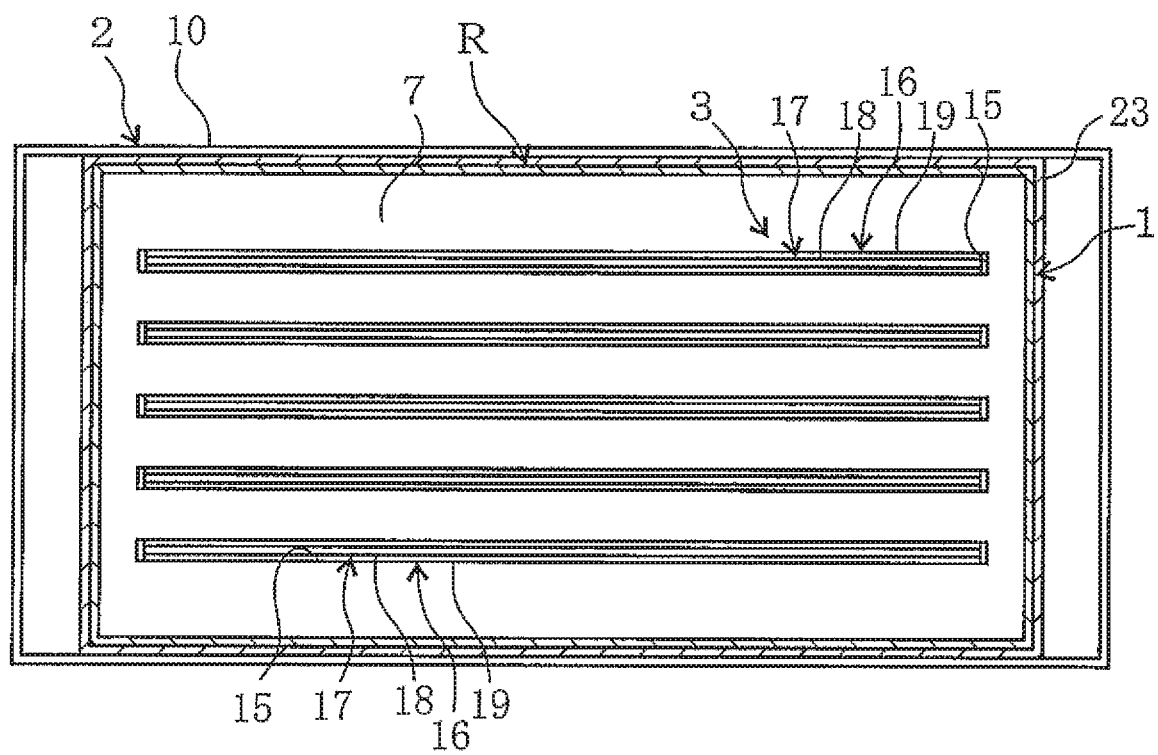
FIG. 9 is a sectional view of the pneumatic radiation air conditioner of FIG. 8, taken along a plane including line E-E of FIG. 8.
Figure 10:
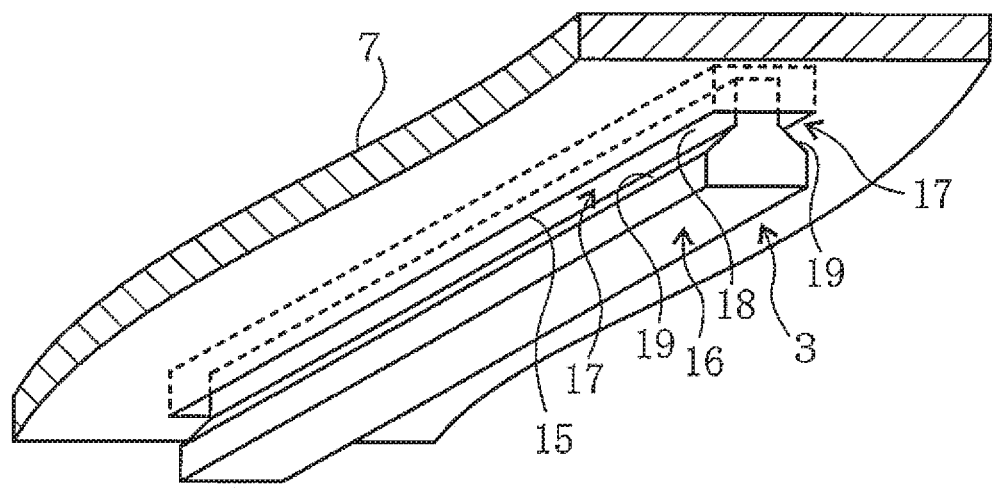
FIG. 10 is a bottom perspective view of an air stream adjuster of the pneumatic radiation air conditioner of FIG. 8.
Figure 12:
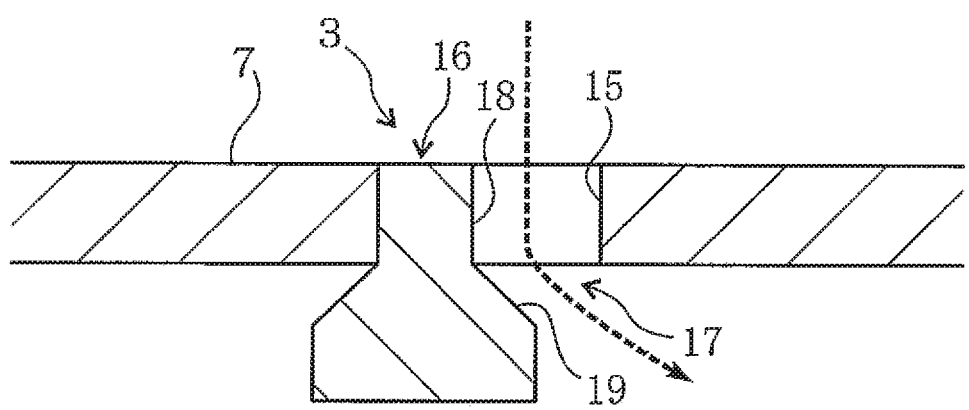
FIG. 12 is an enlarged sectional view of the air stream adjuster of FIG. 8.

FIG. 11 shows one guide 16 whose support portion 18 is provided such that a gap is formed along the entire inner peripheral surface of the third through-hole 15. FIG. 12 shows another guide 16 whose support portion 18 is partly fixed to a part of the inner peripheral surface of the third through-hole 15. With the guide 16 of FIG. 11, streams of the air-conditioning air flowing out of the gap between the support portion 18 and the third through-hole 15 can be caused to flow away from each other by the flap portion 19, and thereby the air-conditioning air can be caused to flow uniformly. On the other hand, with the guide 16 of FIG. 12, the air-conditioning air can be caused to flow in a single direction, i.e., non-uniformly, by the flap portion 19. Thus, by changing the arrangement of the support portion 18 in each third through-hole 15, the air volume distribution of the air-conditioning air can be adjusted freely. The number of third through-holes 15, the number of guides 16, and the number of airflow paths 17 are set in accordance with, for example, a preset air volume and a preset air velocity. In FIG. 9, the shape of each of the third through-holes 15, the guides 16, and the airflow paths 17 is long and thin so that they can be readily formed. Other conceivable examples of the shape of each of the third through-holes 15, the guides 16, and the airflow paths 17 include various shapes, such as a square shape and a circular shape. Since the other configurational features of Embodiment 2 are the same as those of Embodiment 1, the description thereof is omitted.

Embodiment 3

Figure 13:
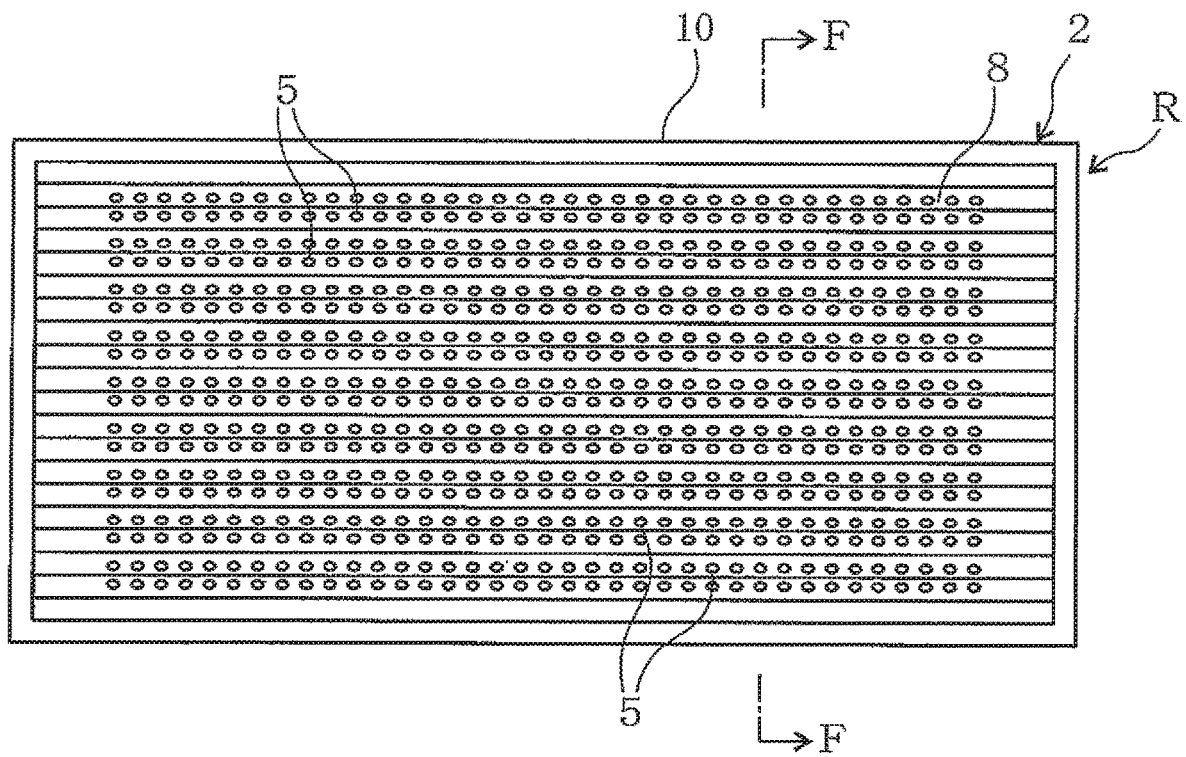
FIG. 13 is a bottom view of the pneumatic radiation air conditioner according to Embodiment 3.
Figure 14:
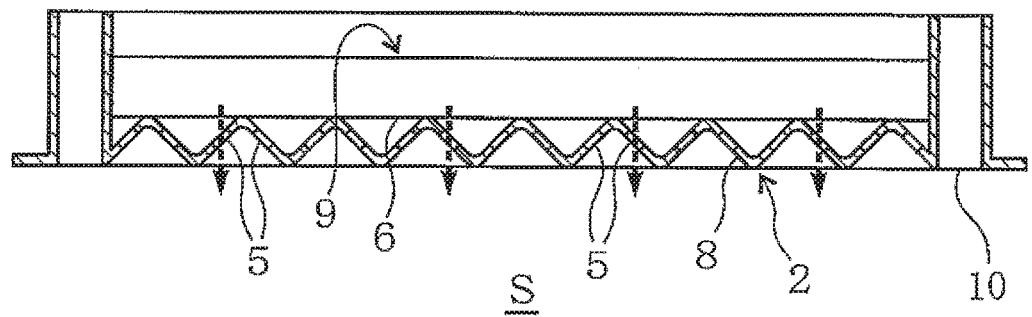
FIG. 14 is a sectional view of a second chamber of the pneumatic radiation air conditioner of FIG. 13, taken along a plane including line F-F of FIG. 13.

FIG. 13 and FIG. 14 show Embodiment 3 of the pneumatic radiation air conditioner 100 of the present invention. In the present embodiment, the second air discharger 8 of the second chamber 2, the second air discharger 8 facing the space S to be air conditioned, has a corrugated shape. That is, in the present embodiment, the second air discharger 8 is not flat plate-shaped, but has a corrugated shape in which inclined ridges and grooves with sharp ends are alternately arranged in the width direction or depth direction of the space S to be air conditioned. Since the second air discharger 8 has a corrugated shape, the contact area between the air-conditioning air and the second air discharger 8 is greater than in a case where the second air discharger 8 has a flat shape. This makes it possible to improve the thermal radiation performance of the second air discharger 8. The inclination angle and the height of the ridges and grooves, and the number of ridges and grooves, may be set arbitrarily. Since the other configurational features of Embodiment 3 are the same as those of Embodiments 1 and 2, the description thereof is omitted.

It should be noted that the present invention is not limited to the above-described embodiments. For example, although the pneumatic radiation air conditioner 100 is disposed in the ceiling chamber T in the above-described embodiments, the pneumatic radiation air conditioner 100 may alternatively be installed in a separate room provided to the side of the space S to be air conditioned.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF THE REFERENCE CHARACTERS 1 first chamber
2 second chamber
4 first through-hole
5 second through-hole
6 plate
7 first air discharger
8 second air discharger
9 heat storage unit
10 frame member
15 third through-hole
16 guide
17 airflow path
18 support portion
19 flap portion
20 heat exchanger
21 fan
23 casing
25 heat transfer plate
26 heat transfer pipe
R radiation unit
S space to be air conditioned

What is claimed is:

1. A pneumatic radiation air conditioner comprising:
a radiation unit configured to radiate air-conditioning air; and
a fan configured to feed the air-conditioning air to the radiation unit, wherein
the radiation unit includes:
a first chamber, through which the air-conditioning air flows;
a second chamber configured to take in the air-conditioning air discharged from the first chamber and discharge the air-conditioning air and radiate heat of the air-conditioning air to a space to be air conditioned; and
an air stream adjuster configured to adjust air velocity distribution and air volume distribution of the air-conditioning air that is discharged from the first chamber to the second chamber, the air stream adjuster includes:

a group of first through-holes formed therein, through which the air-conditioning air is discharged to the second chamber, the second chamber including a group of second through-holes formed therein, through which the air-conditioning air is discharged to the space to be air conditioned;

a third through-hole, through which the air-conditioning air is discharged to the second chamber;

a guide disposed in the third through-hole and configured to guide an air stream; and an airflow path that is a space between the guide and the third through-hole, the airflow path being configured such that an area of passage of the air stream in the airflow path increases from an upwind side to a downwind side, and the guide includes:

a support portion disposed such that a gap is formed between the support portion and a peripheral surface of the third through-hole; and a flap portion provided downwind of the support portion, the flap portion being sloped in a manner to expand from the upwind side to the downwind side, the flap portion being configured to change an advancing direction of the air-conditioning air that passes through the gap between the support portion and the peripheral surface of the third through-hole.

2. The pneumatic radiation air conditioner according to claim 1, wherein a total area of the group of second through-holes is greater than a total area of the group of first through-holes.

3. The pneumatic radiation air conditioner according to claim 1, wherein an area of passage of the air-conditioning air in the first chamber decreases from the upwind side to the downwind side.

4. The pneumatic radiation air conditioner according to claim 1, wherein the second chamber includes a heat storage unit constituted by a plurality of plates, the heat storage unit being configured to store the heat of the air-conditioning air discharged from the second chamber and radiate the stored heat, wherein the plurality of plates are arranged such that a gap is formed between every two adjacent plates, the gap allowing the air-conditioning air to pass therethrough.

5. The pneumatic radiation air conditioner according to claim 1, wherein the second chamber includes an air discharger that is formed on a part of the second chamber, the part facing the space to be air conditioned, and the air discharger has a corrugated shape in which ridges and grooves are alternately arranged in a width direction or a depth direction of the space to be air conditioned.

6. The pneumatic radiation air conditioner according to claim 1, further comprising a heat exchanger disposed on an air passage between the fan and the radiation unit, the heat exchanger being configured to perform heat exchange of the air-conditioning air.

* * * * *